United States Patent [19]

Klosterhuber et al.

[11] Patent Number: 5,362,093
[45] Date of Patent: Nov. 8, 1994

[54] TWIN CONTROL ARM AXLE ASSEMBLY FOR WHEEL SUSPENSION SYSTEMS

[75] Inventors: Robert Klosterhuber, Stuttgart; Karl Sommerer, Wiernsheim, both of Germany

[73] Assignee: Dr. Ing. h.c.F. Porsche AG, Weissach, Germany

[21] Appl. No.: 91,355

[22] Filed: Jul. 15, 1993

[30] Foreign Application Priority Data

Jul. 23, 1992 [DE] Germany ............................. 4224288

[51] Int. Cl.⁵ .......................... B60G 3/20; B60G 7/02; F16C 11/08
[52] U.S. Cl. .................................... 280/674; 280/716
[58] Field of Search .......................... 280/673, 674, 716

[56] References Cited

U.S. PATENT DOCUMENTS 3,549,167 12/1970 Haverbeck ............................ 280/674
4,865,350 9/1989 Yamamoto ............................ 280/716
4,905,771 3/1990 Stark .................................... 280/716

FOREIGN PATENT DOCUMENTS 4021896 7/1990 Germany.

*Primary Examiner*—Kenneth R. Rice
*Attorney, Agent, or Firm*—Evenson, McKeown, Edwards & Lenahan

[57] ABSTRACT

A twin control arm axle suspension system for wheels of motor vehicles is suggested which comprises a wheel carrier supporting the wheel on which, in a lower plane, a first control arm unit and, in an upper plane, a second control arm unit are disposed in an articulated manner by way of elastic control arm bearings and are held on the body in a swivellable manner. The second control arm unit is connected with the wheel carrier by way of a control arm bearing which is coordinated in a defined manner in the longitudinal and transverse direction—with respect to forces affecting the wheel. The control arm bearing is constructed to be stiffer in the transverse directions and in the longitudinal direction (driving direction) than in the longitudinal direction (against the driving direction).

7 Claims, 3 Drawing Sheets

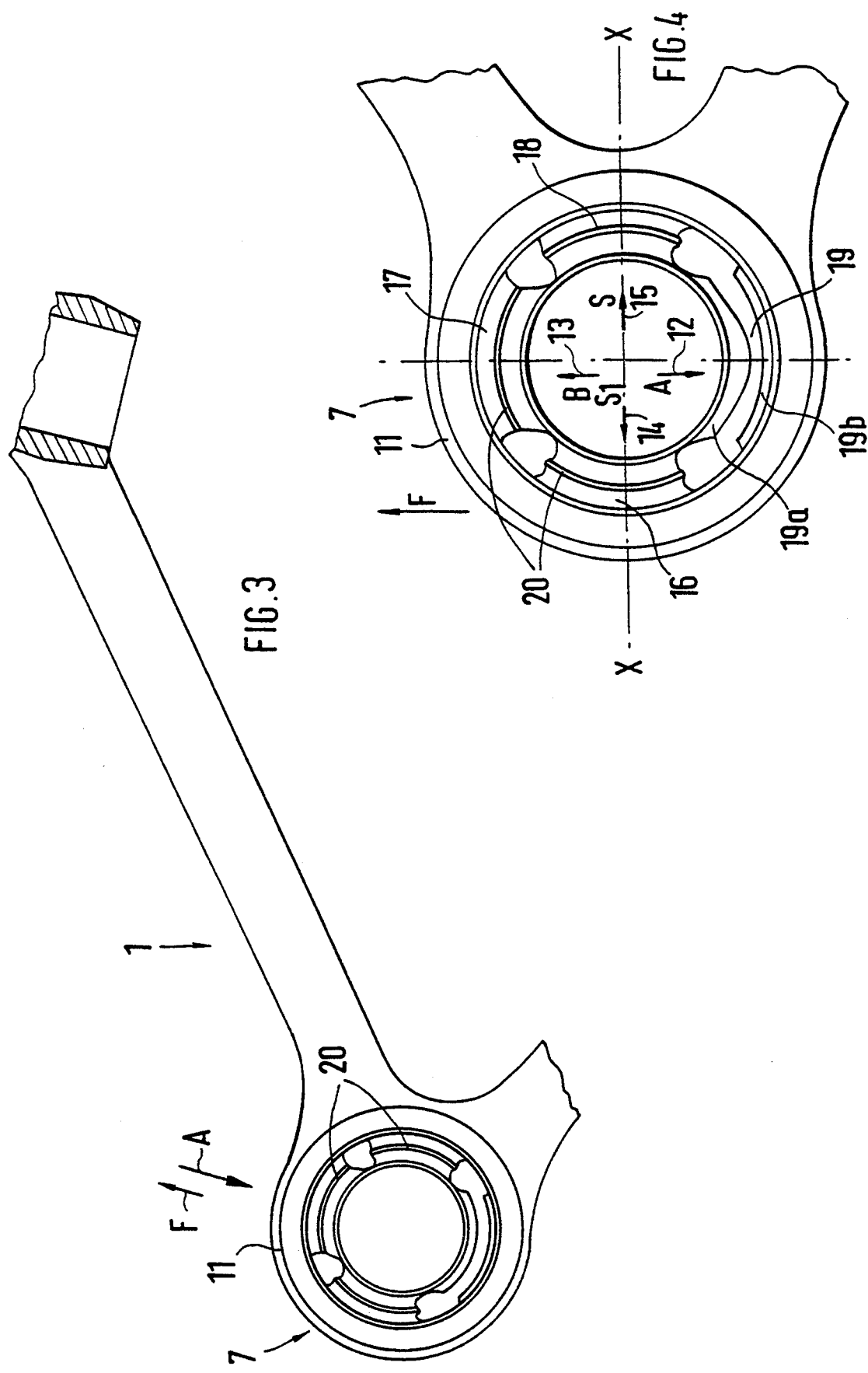

TWIN CONTROL ARM AXLE ASSEMBLY FOR WHEEL SUSPENSION SYSTEMS

BACKGROUND AND SUMMARY OF THE INVENTION

This invention relates to a twin control arm axle assembly for vehicle wheel suspension systems.

From German Patent Document DE-40 21 896 C1, a wheel suspension is known for steerable front wheels of motor vehicles in the case of which lateral-force understeering elastokinematics are achieved by way of a guiding joint on the wheel carrier which is constructed to be soft in the transverse direction of the vehicle and harder in its longitudinal direction.

It is an object of the invention to provide a twin control arm axle with a control arm bearing of a defined elasticity which excludes an elastokinematic control function of the wheels under the effect of forces and ensures a wheel suspension that insulates rolling noises as well as longitudinal shocks.

According to the invention, this object is achieved by means of a wheel suspension arrangement including:
- a wheel carrier which supports a vehicle wheel,
- a lower control arm unit connecting the wheel carrier to a vehicle body in an articulated manner,
- and an upper control arm unit connecting the wheel carrier to the vehicle body in an articulated manner,
- wherein the upper control arm unit includes a control arm connected to the wheel carrier by way of an elastic control arm bearing which has defined bearing characteristics with respect to different in use driving forces acting on the wheel carrier with said control arm bearing being stiffer in transverse directions and in the vehicle longitudinal driving direction than in the direction opposite the vehicle longitudinal driving direction.

The advantages achieved by means of the invention are essentially that, because of the connection of the upper control arm to an elastic control arm bearing of the wheel carrier which is constructed to be harder in the transverse direction of the vehicle and in the driving direction than against the driving direction, a possibility is provided to buffer shocks exercised on the wheel in order to avoid noises. In addition, it is avoided that the wheel is influenced by the effect of braking forces and lateral forces on the wheel so that no disadvantageous control function can occur by way of the elastic control arm bearing.

The control arm bearing is preferably constructed as a vertical ball joint, in which case the spherical part of the joint is embedded in a surrounding rubber elastic layer and is surrounded by a bearing housing. The soft area of the control arm bearing is formed by a recess in contrast to the harder areas which are constructed as massive layers.

A limiting device for the control arm bearing is formed by a bent metal plate of a reinforcing plate in the rubber elastic layer. This bent plate reaches over the bearing to the control arm eye.

The soft area of the control arm bearing formed by the recess may have opposite rubber elastic layer parts which may impact on one another during the operation. Likewise, a center area of the layer parts may be arched to the front.

The control arm bearing of a defined elasticity can be used for a rear axle as well as for a front axle. In the case of a rear axle, the elastic control arm bearing may make a subframe unnecessary that is connected between the wheel suspension and the vehicle body because the longitudinal suspension is now absorbed by the bearing.

In particular, it is possible to advantageously use the elastic control arm bearing in the case of an upper control arm which is constructed as an A-arm and a lower control arm device which comprises two or three individual control arms.

Because of the construction of the elastic control arm bearing on the wheel carrier, almost no movement of the spherical part of the joint is possible in the transverse and braking direction, that is, in the driving direction, so that a windup during braking can also not take place.

Other objects, advantages and novel features of the present invention will become apparent from the following detailed description of the invention when considered in conjunction with the accompanying drawings.

BRIEF DESCRIPTION OF THE DRAWINGS

FIG. 3 is a top view of FIG. 2 of the control arm bearing; and

FIG. 4 is an enlarged top view of the elastic control arm bearing.

DETAILED DESCRIPTION OF THE DRAWINGS

Figure 1:
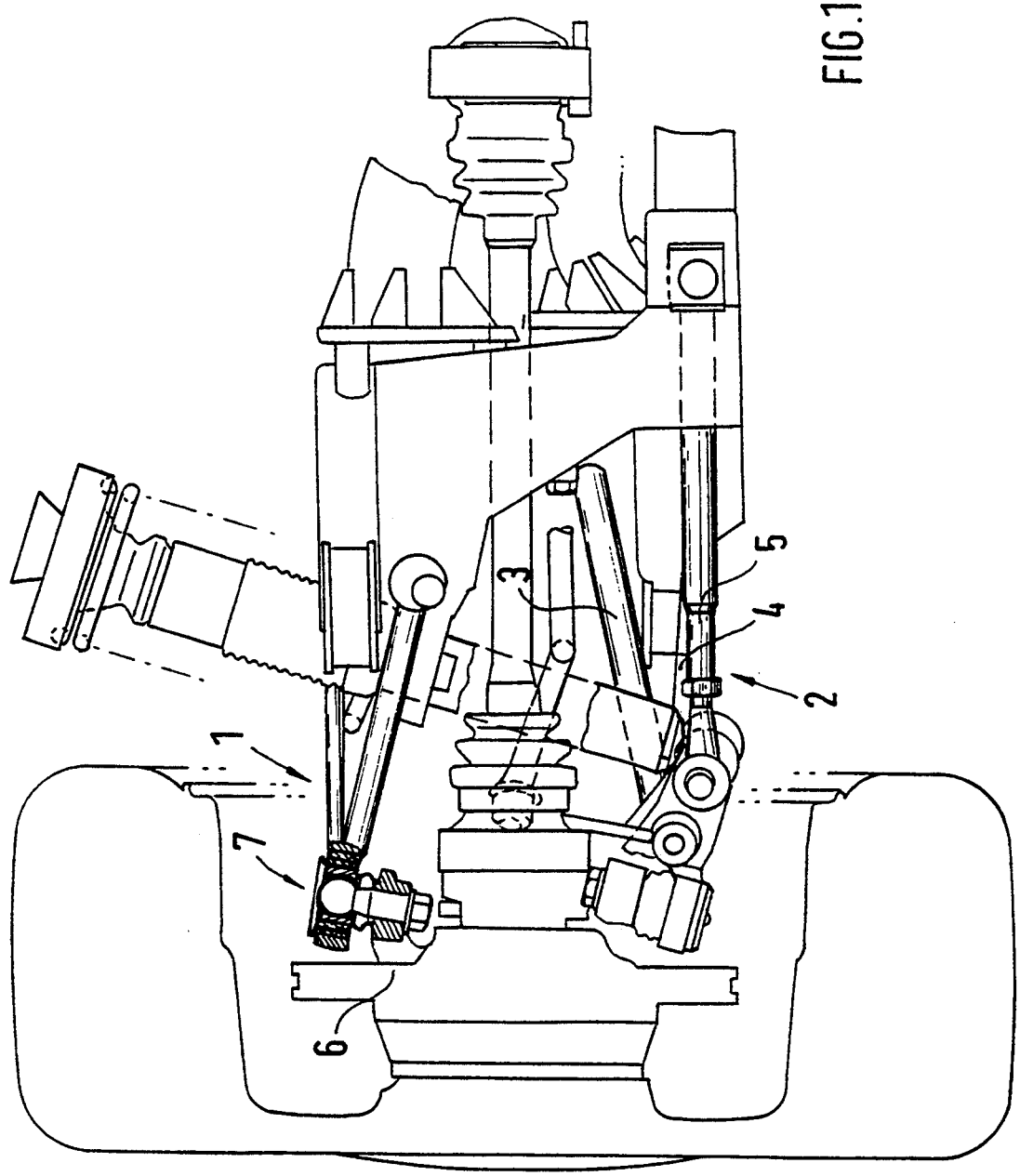
FIG. 1 is a schematic frontal view of a twin control arm axle wheel suspension arrangement with an upper A-arm and a lower separated control arm device, constructed according to a preferred embodiment of the invention.
Figure 2:
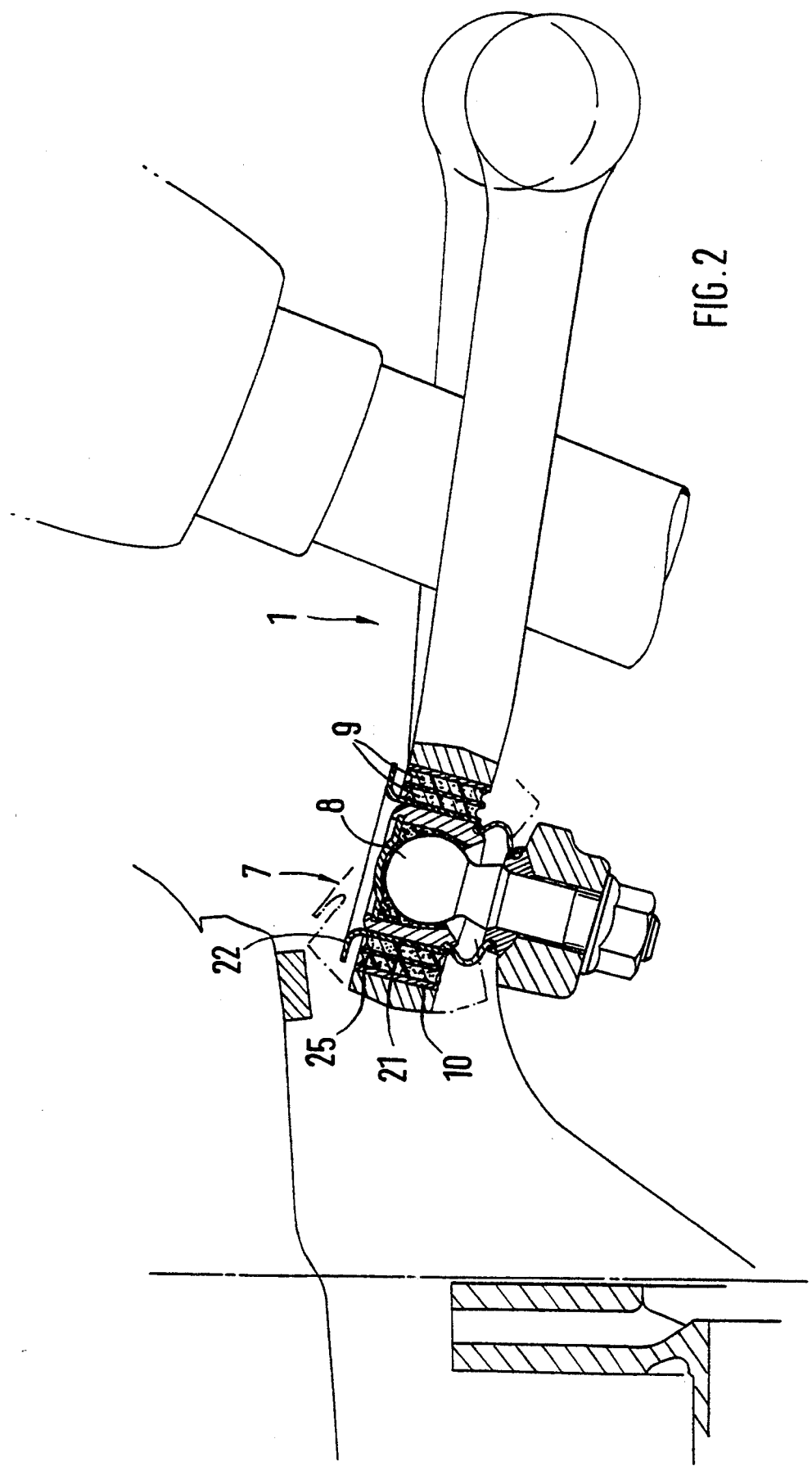
FIG. 2 is an enlarged frontal view of the upper A-arm of FIG. 1 with an elastic control arm bearing on the wheel carrier.

The wheel suspension arrangement for the wheels of a motor vehicle comprises an upper control arm unit 1 constructed as an A-arm as well as a lower control arm unit 2 consisting of two separated individual control arms 3 and 4 as well as a tie rod 5.

The A-arm 1 is held on the wheel carrier 6 in a single bearing 7 of a defined elasticity. The individual control arms are pivotally connected on the wheel carrier 6 in additional bearings and are held in a swivelling manner on the body side.

The control arm bearing 7 essentially comprises a ball joint in the case of which the spherical part 8 is embedded in an elastic layer 9 which, in turn, is held in a bearing housing 10 which is inserted in a control arm eye 11.

In the longitudinal direction 12 against the driving direction F, the bearing 7 is constructed to be softer than in the longitudinal direction 13 in the driving direction F. In the transverse directions 14 and 15, the bearing 7 is constructed to be approximately identically hard, as also in the longitudinal direction 12.

The different characteristics of the control arm bearing 7 in the transverse direction and the longitudinal direction are formed by massive parts 16, 17 and 18 as well as by a recess 19 in the rubber elastic layer 9 of the bearing 7. The recess 19 extends transversely with respect to the vehicle, is formed between rubber elastic parts 19a and 19b of the layer 9 and is arranged—with respect to the driving direction F—behind the perpendicular plane X—X.

In the massive portions 16, 17 and 18 of the rubber elastic layer 9, reinforcing plates 20 are arranged, in which case a reinforcing plate 21 either directly surrounds the spherical part 8 of the joint or is arranged to be embedded in the layer 9. This reinforcing plate 21 has an upper bent-off area 22 which is used as a limiting device and reaches over the bearing 7 to the control arm eye 11.

By means of the construction of the bearing 7 with different elastic areas, such as the hard areas 16, 17 and 18 as well as the single softer area with the recess 19, in the case of a force A (FIG. 4) acting upon the wheel (road impact) in the longitudinal direction 12, a longitudinal suspension is achieved. No wheel adjusting or control function occurs in the case of forces S, S1 (lateral forces) in the transverse directions 14, 15 as well as in the case of forces B (braking forces) in the longitudinal direction 13 in the driving direction F.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A twin control arm axle assembly suspension arrangement for wheels of motor vehicles comprising:
    a wheel carrier which supports a vehicle wheel,
    a lower control arm unit connecting the wheel carrier to a vehicle body in an articulated manner,
    and an upper control arm unit connecting the wheel carrier to the vehicle body in an articulated manner,
    wherein the upper control arm unit includes a control arm connected to the wheel carrier by way of an elastic control arm bearing which has defined bearing characteristics with respect to different in use driving forces acting on the wheel carrier with said control arm bearing being stiffer in transverse directions and in the vehicle longitudinal driving direction than in the direction opposite the vehicle longitudinal driving direction.

2. A suspension arrangement according to claim 1, wherein the elastic control arm bearing has a rubber elastic layer between a spherical part of a ball joint and a bearing housing which reaches around a recess which extends transversely with respect to the vehicle and which—with respect to the driving direction (F)—is arranged behind a transverse axis (X—X).

3. A suspension arrangement according to claim 2, wherein the area disposed opposite the recess as well as the areas of the rubber elastic layer which are each arranged laterally of the recess are constructed to be massive.

4. A suspension arrangement according to claim 3, wherein, in the massive areas of the rubber elastic layer on the side of the circumference of the spherical part of the joint, reinforcing plate parts are molded in and a reinforcing plate which encloses the spherical part has a bent portion which reaches over the rubber elastic layer and which extends to the control arm eye.

5. A suspension arrangement according to claim 2, wherein the recess is provided between opposite rubber elastic parts.

6. A suspension arrangement according to claim 3, wherein the recess is provided between opposite rubber elastic parts.

7. A suspension arrangement according to claim 4, wherein the recess is provided between opposite rubber elastic parts.

* * * * *